United States Patent [19]

Hauge

[11] 4,309,395

[45] Jan. 5, 1982

[54] PHOSPHORIC ACID PRODUCTION

[76] Inventor: Douglas O. Hauge, 930 Acalanes Rd., Lafayette, Calif. 94549

[21] Appl. No.: 142,424

[22] Filed: Apr. 21, 1980

[51] Int. Cl.$^3$ ............................................. C01B 25/16
[52] U.S. Cl. ..................................... 423/320; 423/167
[58] Field of Search ................ 423/319, 320, 166, 167

[56] References Cited

U.S. PATENT DOCUMENTS

| | | | |
|---|---|---|---|
| 1,910,808 | 5/1933 | Moore | 23/165 |
| 2,013,970 | 9/1935 | Moore | 23/165 |
| 2,233,956 | 3/1941 | Moore | 23/165 |
| 2,338,408 | 1/1944 | Coleman et al. | 23/165 |
| 2,384,814 | 9/1945 | Coleman | 23/109 |
| 2,897,053 | 7/1959 | Savanoe | 23/165 |
| 3,130,039 | 4/1964 | Kohn | 71/43 |
| 3,401,014 | 9/1968 | Saeman | 23/109 |
| 3,418,077 | 12/1968 | Robinson | 423/320 |
| 3,442,610 | 5/1969 | Mustian et al. | 23/165 |
| 3,494,735 | 2/1970 | Cochran | 23/165 |
| 3,552,918 | 1/1971 | Filch | 423/320 |
| 3,743,725 | 7/1973 | Case | 423/320 X |
| 3,792,151 | 1/1974 | Case | 423/320 |
| 4,196,172 | 4/1980 | Ore et al. | 423/320 |

FOREIGN PATENT DOCUMENTS 1250191 10/1971 United Kingdom ................ 423/320

OTHER PUBLICATIONS

Cambell et al., "System Calcium Oxide-Phosphorus Pentoxide-Sulfur Trioxide-Water at 75.3C.", I and EC, p. 1295, vol. 40, 1948

Farr et al., "System CaO–P$_2$O$_5$–HF–H$_2$O: Equilibrium at 25° and 50°", Division of Chemical Development, TVA, vol. 66, p. 318, 1961.

*Primary Examiner*—O. R. Vertiz
*Assistant Examiner*—Gregory A. Heller
*Attorney, Agent, or Firm*—Limbach, Limbach & Sutton

[57] ABSTRACT

A process is described for producing high purity phosphoric acid of 40% P$_2$O$_5$ concentration from phosphate rock. The process is controlled to achieve the desired results by monitoring and controlling the sulfuric acid content at various processing stations resulting in the control of gypsum formation and the minimization of freed impurities in the phosphate rock.

4 Claims, 1 Drawing Figure

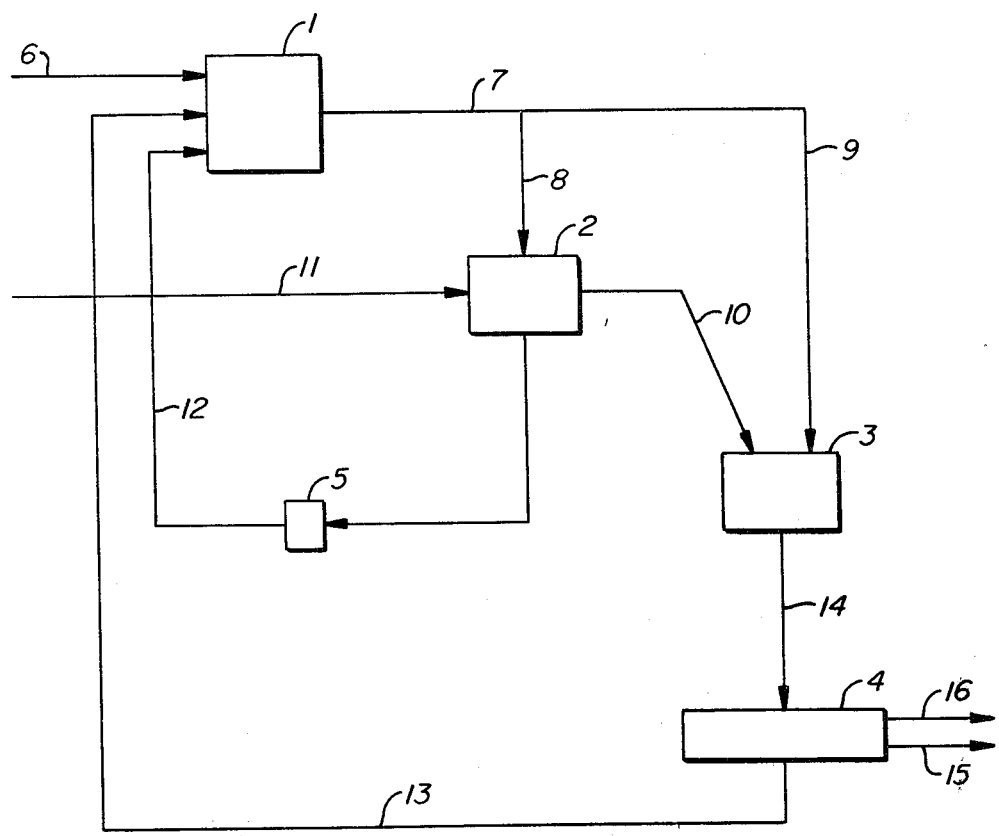

PHOSPHORIC ACID PRODUCTION

BACKGROUND OF THE INVENTION

The commercial production of phosphoric acid by the "wet process" generally comprises the digestion of ground phosphate rock containing apatite ($3Ca_3(PO_4)_2 \cdot CaF_2$) and/or tricalcium phosphate ($Ca_3(PO_4)_2$). With dilute mineral acid (e.v. sulfuric acid) to produce a weak orthophosphoric acid solution in a calcium salt which is then separated from the solution by an appropriate technique. It has been found that if the sulfate ion concentration in the initial digestion tank is appreciable, the fluoride of the feed rock dissolves converting it to fluorosilisic acid which in turn dissolves the various clays and releases iron and aluminum and other impurities into the process stream.

Applicants have also noted the competing reactions which take place within the initial reactor vessel including solubilization of the phosphate by the phosphoric acid and the formation of gypsum by the sulfuric acid. This invention also deals with the removal of the sulfate ion in the phosphoric acid to a point where solubilization of the rock is both rapid and complete. In other words, the processing parameters have been adjusted to solubilize the greatest amount of rock with the minimum amount of calcium sulfate precipitation.

SUMMARY OF THE INVENTION

A process for producing phosphoric acid from rock phosphate is disclosed. In this process, finely divided rock phosphate, phosphoric acid having a minor content of sulfuric acid and water are fed into a first mixing zone in which the formation of a slurry is achieved. The slurry is continuously withdrawn from the first mixing zone and about 90% of this slurry is fed into a second mixing zone and the remainder of the slurry is fed into a third mixing zone. The slurry of the second mixing zone is mixed with about 102% to 104% of the quantity of sulfuric acid stoichiometrically required to precipitate the calcium ion contained in the slurry. Approximately 80% to 90% by weight of the slurry in the second mixing zone is returned to the first mixing zone and the remainder is fed to the third mixing zone. The slurry in the third mixing zone is continuously withdrawn and filtered in a filtering zone to separate a filter cake and filtrate having a $P_2O_5$ content of about 40% by weight. A portion of the filtrate is withdrawn as final product. The filter cake is washed with water and this is added to a portion of the previously withdrawn filtrate to form a liquid having a $P_2O_5$ content about 25% by weight. This liquid is returned to the first mixing zone to provide an initial feed of phosphoric acid.

The slurry located in the first mixing zone is periodically monitored as well as the sulfate ion concentration in the second mixing zone. These respective values can be adjusted and controlled by adjusting the rate of addition of slurry from the second to the first mixing zones to maintain the calcium ion concentration in the slurry of the first mixing zone in the range of 1.0% to 2.5% by weight and the sulfate ion concentrate the second mixing zone to between approximately 2% to 4% by weight.

DETAILED DESCRIPTION OF THE INVENTION

The present invention can be more thoroughly appreciated by viewing the appended drawing which is a flow sheet diagrammatically illustrating the various vessels, all of which are conventional, employed in the process of the present invention.

Phosphate rock is added to initial mixing vessel 1 diagrammatically shown by arrow 6. To this is added phosphoric acid which can be added to mixing vessel 1 from an independent source or as an output from the system shown in the drawing whereby phosphoric acid collected from filter 4 is recycled back to mixing vessel 1 via stream 13. This first step is called digestion and is governed by the following reaction:

Approximately 90% by weight of the slurry from the first mixing zone is passed into a second mixing zone 2 and the remaining slurry passed into yet another mixing zone 3. Thus, slurry exiting mixing zone 1 via stream 7 is split into streams 8 and 9, approximately 90% of the slurry passing through stream 8. The slurry in the second mixing zone is then combined with sulfuric acid shown entering mixing zone 2 via line 11 in an amount equal to about 102% to 104% of the quantity of acids stoichiometrically required to precipitate the calcium ion contained in the slurry. This reaction proceeds as follows:

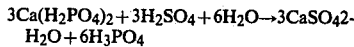

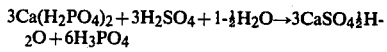

Approximately 80 to 90% of the slurry exiting mixing chamber 2 passes by stream 12 through evaporator 5 and is recycled back to mixing chamber 1. It is by controlling this recycled stream that the respective concentrations of calcium ion and sulfate ion can be controlled within mixing vessel 1. The slurry passes through a flash evaporator 5 for cooling the slurry by evaporating some of the water. The remaining 10% to 20% of the slurry exiting mixing vessel 2 passes via stream 10 into vessel 3 which also receives slurry from mixing vessel 1 directly via line 9.

The output from mixing vessel 3 passes via line 14 to filter 4 to separate the filter cake and filtrate having a $P_2O_5$ content about 40% by weight. A portion of the filtrate is withdrawn as a final product as shown by line 15. The filter cake can be washed with water to remove residual $P_2O_5$ concentration of approximately 25% by weight which is then returned to mixing vessel 1 via line 13 to provide the phosphoric acid in the initial mixing vessel. Gypsum is removed from the system as shown by line 16.

The foundation of the invention lies in controlling the calcium ion concentration in the slurry in mixing vessel 1 while adjusting the sulfate ion concentration in mixing vessel 2 to specific values. It has been determined that those advantages outlined above in practicing the present invention can best be carried out when the calcium ion concentration in the slurry of mixing vessel 1 is in the range of 1.0% to 2.5% by weight while the rate of sulfuric acid addition to the second mixing vessel is carried out in order to maintain sulfate ion concentration in the slurry in said mixing vessel in the range of 2% to 4% by weight.

EXAMPLE

Approximately 3.4 tons of phosphate rock having a quality of approximately 30% $P_2O_5$ was added to an initial mixing vessel together with 6.28 tons of phosphoric acid (25.2% $P_2O_5$). The mixing vessel was maintained at approximately 160° F. The initial mixing vessel was also the recipient of a slurry from a second mixing vessel containing sulfate ions. The output from the initial mixing vessel being approximately 48 tons was split into two fluid streams, the first stream consisting of approximately 42.75 tons was fed into a second mixing vessel and the remainder, approximately 5.25 tons was fed to a third mixing vessel. In the second mixing vessel was also added approximately 3.31 tons of sulfuric acid which reacted with the slurry output from the first mixing vessel as described in the equations recited above.

The slurry output from the second mixing vessel was split into two fluid streams, the first consisting of approximately 39.6 tons of slurry which was passed through an evaporator, evaporating approximately 0.93 tons of water. The remaining 38.67 tons of slurry was injected into the initial mixing vessel and became a reaction product with the initial phosphate rock and phosphoric acid. The remaining 5.1 tons of slurry output from vessel 2 was fed to vessel 3. The output from vessel 3, approximately 10.85 tons of slurry was fed to a filter which in turn yielded approximately 6.67 tons of gypsum and filtrate of phosphoric acid. This system yielded approximately 2.5 tons 40% phosphoric acid while the filter cake was washed and mixed with phosphoric acid product to recycle approximately 6.28 tons of phosphoric acid (25.2% $P_2O_5$) to the initial mixing vessel.

I claim:
1. A process for producing phosphoric acid from rock phosphate which comprises:
   a. continuously feeding finely divided rock phosphate and phosphoric acid into a first mixing zone to form a slurry;
   b. continuously withdrawing said slurry from said first mixing zone and passing about 90 percent of the withdrawn slurry into a second mixing zone and the remainder of the withdrawn slurry into a third mixing zone;
   c. mixing the slurry in the second mixing zone with concentrated sulfuric acid in a stoichiometric excess of that required to precipitate the calcium ion contained in the slurry;
   d. withdrawing slurry from the second mixing zone and passing about 80–90 percent of the withdrawn slurry into the first mixing zone and the remainder of the withdrawn slurry into the third mixing zone;
   e. continuously withdrawing slurry from the third mixing zone and filtering it in a filtering zone to separate a filter cake and filtrate;
   f. withdrawing a portion of the filtrate as product;
   g. washing the filter cake with water and adding the washings to the remainder of the filtrate and returning the resultant mixture to the first mixing zone;
   h. periodically determining the calcium ion concentration in the slurry of the first mixing zone and sulfate ion concentration in the second mixing zone;
   i. adjusting the quantity of slurry returned from the second mixing zone to the first mixing zone to maintain the calcium ion concentration in the first mixing zone in the range of approximately 1.0% to 2.5% by weight; and
   j. adjusting the rate of sulfuric acid addition to the second mixing zone to maintain sulfate ion concentration in the slurry in said mixing zone in the range of approximately 2.0% to 4% by weight.

2. The process of claim 1 wherein the rock phosphate and phosphoric acid feed of step (a) also contains minor amounts of water and sulfuric acid.

3. The process of claim 1 wherein the filtrate exiting said filtering zone has a $P_2O_5$ content of approximately 40% by weight.

4. The process of claim 1 wherein the filter cake is washed with water and the washings added to additional phosphoric acid to form a liquid having a $P_2O_5$ content of approximately 25% by weight which is returned to the first mixing zone.

* * * * *